J. V. AVRET.
SEED DRILL.
APPLICATION FILED MAR. 25, 1911.

1,065,201.

Patented June 17, 1913.

2 SHEETS—SHEET 1.

Witnesses
J. L. Wright
E. E. ...

Inventor
John V. Avret,
By Victor J. Evans,
Attorney

COLUMBIA PLANOGRAPH CO., WASHINGTON, D. C.

J. V. AVRET.
SEED DRILL.
APPLICATION FILED MAR. 25, 1911.
1,065,201.
Patented June 17, 1913.
2 SHEETS—SHEET 2.
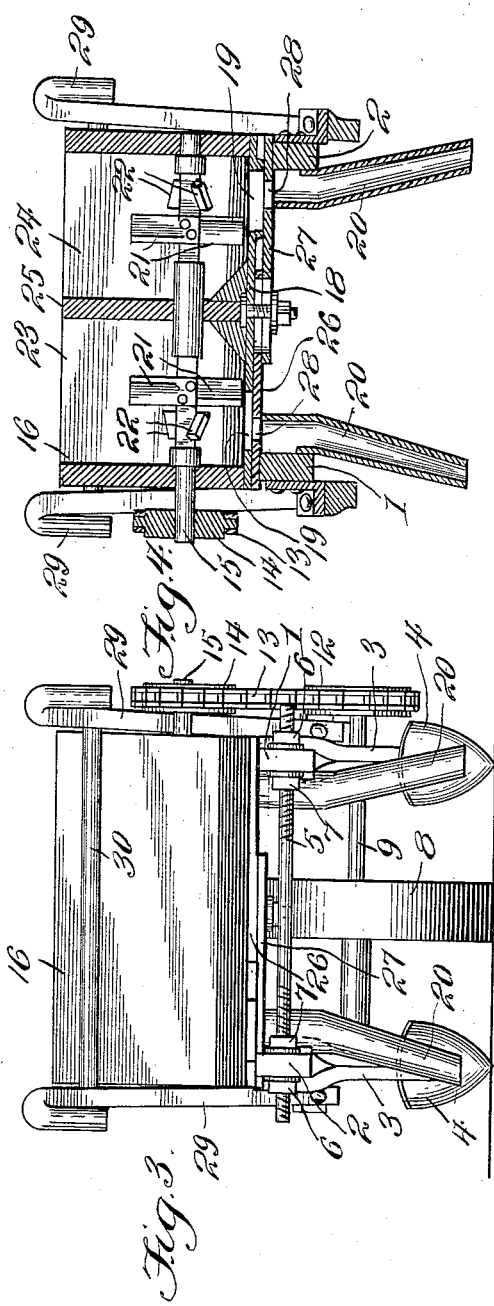
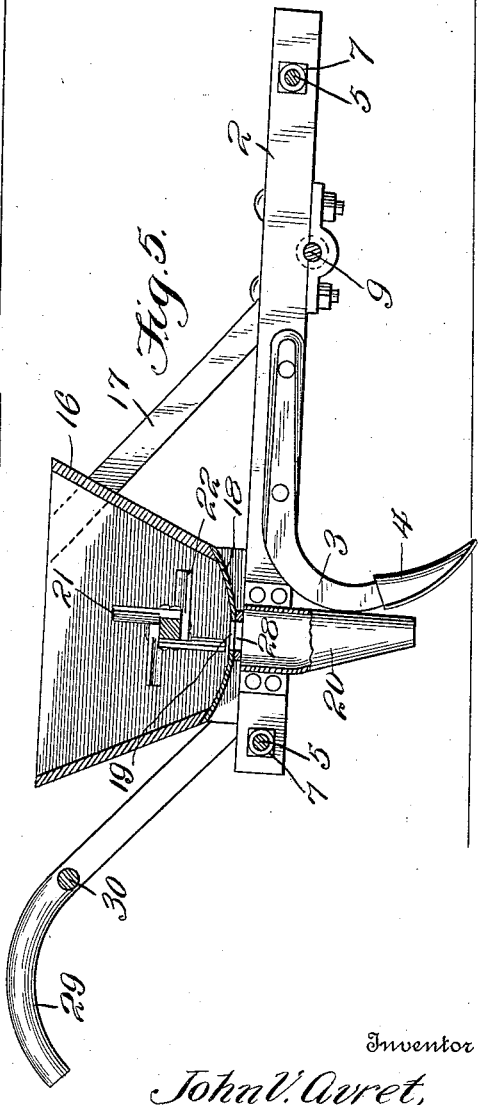

UNITED STATES PATENT OFFICE.

JOHN V. AVRET, OF GRESHAMVILLE, GEORGIA.

SEED-DRILL.

1,065,201.     Specification of Letters Patent.     Patented June 17, 1913.

Application filed March 25, 1911. Serial No. 616,904.

*To all whom it may concern:*

Be it known that I, JOHN V. AVRET, a citizen of the United States, residing at Greshamville, in the county of Greene and State of Georgia, have invented new and useful Improvements in Seed-Drills, of which the following is a specification.

This invention relates to seed drills and the particular object of the invention is to provide a simple and efficient drill which may be operated by a single man and by one horse so that the operation of seeding a certain plot of ground is not made expensive.

A further object of the invention is the provision of a drill having the seed distributing tubes carried by the beams and means for adjusting the beams so as to determine the width of the rows. These beams and seed distributing tubes are associated with a hopper mounted upon the beams and which is provided with distributing openings adjustable to register with the distributing tubes.

Further objects of the invention will appear as the following specific description is read in connection with the accompanying drawings, which form a part of this application, and in which:—

Figure 1:
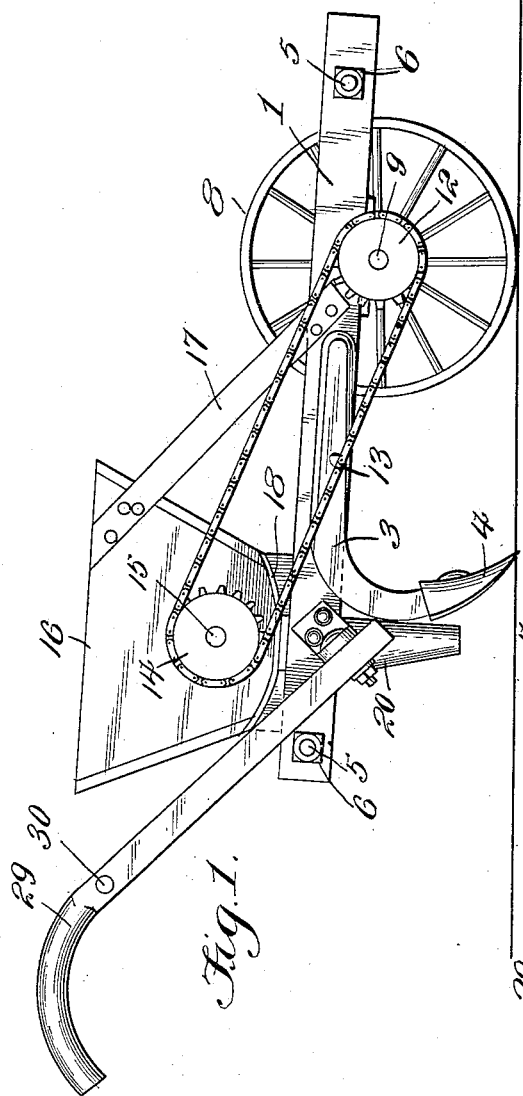
Figure 2:
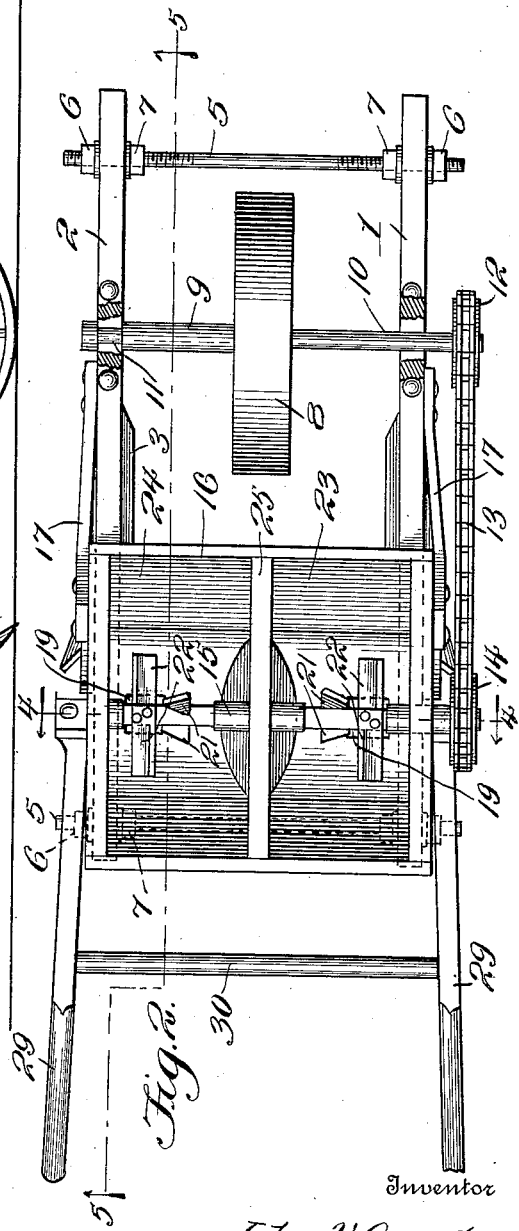

Figure 1 is a side elevation. Fig. 2 is a top plan view. Fig. 3 is a rear elevation. Fig. 4 is a vertical transverse section taken on the line 4—4 of Fig. 2. Fig. 5 is a vertical longitudinal section taken on the line 5—5 of Fig. 2.

Referring more particularly to the drawing, 1 and 2 represent the separate beams, both of which have secured thereto curved plow standards 3 to which the opening blades 4 are secured. These beams are connected together at their front and rear ends by bolts 5 which have adjusting nuts 6 mounted thereon and lock nuts 7 to hold the beams in adjusted position. The forward ends of the beams are supported by a roller 8 journaled upon a transverse shaft 9 which is rotatably and slidably mounted in a bearing 10 and is rotatably mounted in a bearing 11, both of said bearings being carried by the underside of the beams 1 and 2. One end of the shaft 9 has secured thereto a sprocket wheel 12 which is connected by a sprocket chain 13 to a similar wheel 14 on a transverse feeding shaft 15 mounted to rotate in the hopper 16. This hopper rests upon the beams 1 and 2 and is connected thereto by forwardly extending arms 17 which prevent lateral movement thereof but which have sufficient resiliency to permit the varied adjustments of the beams 1 and 2. As each arm is flexed evenly as the beams are adjusted the hopper always remains in proper position on the beams. The bottom of the hopper is shown at 18 and is provided with apertures 19 which are adapted to permit the escape of grain or seed and which are connected, through adjusting means to be hereinafter described, to the feed tubes 20 carried by the rear ends of the beams 1 and 2 and projecting downwardly immediately in the rear of the blade standards.

The shaft 15 has secured thereto two sets of agitating blades, shown at 21 and 22, each set being located in the separate compartments 23 and 24 which are formed by the partition 25 and each set comprises four blades extending at quartering intervals from the shaft and one set of blades operating directly over the holes 19. More correctly speaking, one pair of each set operates over the holes and forces the grain away from the same while the other pair of each set is adapted to force the grain toward the holes, the blades being beveled to perform their respective functions.

Slidably mounted upon the under side of the hopper is a pair of plates 26 and 27, both of which are supplied with apertures 28 which are adapted to register with the apertures 19 in the bottom of the hopper and which are also adapted to register with the upper ends of the seed spouts 20. These plates are provided in order to adjust the amount of seed fed to the spouts and also to control the position of the openings relative to the adjustment of the beams for narrow or wide roads. Suitable handles 29 are shown connected to the beams and extending upwardly and rearwardly therefrom and with a brace connection between the same indicated at 30.

While the covering blades or shovels have not been shown and do not form any part of this invention, they may be readily secured to the beams in the usual manner so as to trail behind the spouts 20.

Having thus described the invention, what I claim as new is:—

A seeder comprising a wheeled frame, a hopper supported thereby, said hopper being formed with seed discharge opening, a shaft mounted in the hopper above the opening and two sets of diametrically opposed blades secured to the shaft within the hopper, one set of said blades operating in a plane wholly within the plane of the opening and the second set operating in a plane partly within the plane of the opening and partly beyond the opening plane, said latter set having blades set at opposite angles of inclination with respect to each other whereby one of the blades of such set will feed grain toward the opening and the other blade of such set will feed said grain from said opening, the first set of blades operating as lifting blades with respect to the opening and the second set operating as feeding blades with respect to the opening.

In testimony whereof I affix my signature in presence of two witnesses.

JOHN V. AVRET.

Witnesses:
H. L. ATKINSON,
S. H. WILLIS.

Copies of this patent may be obtained for five cents each, by addressing the "Commissioner of Patents, Washington, D. C."